(12) United States Patent
Yoshinaga

(10) Patent No.: US 12,233,399 B2
(45) Date of Patent: *Feb. 25, 2025

(54) WATER ABSORPTION TREATMENT MATERIAL AND METHOD FOR MANUFACTURING THE SAME

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 914 days.

This patent is subject to a terminal disclaimer.

(21) Appl. No.: 16/991,174

(22) Filed: Aug. 12, 2020

(65) Prior Publication Data

US 2020/0368720 A1    Nov. 26, 2020

Related U.S. Application Data

(63) Continuation of application No. PCT/JP2019/014641, filed on Apr. 2, 2019.

(30) Foreign Application Priority Data

Apr. 18, 2018    (JP) .................. 2018-079943

(51) Int. Cl.
| | | |
|---|---|---|
| *B01J 20/26* | (2006.01) | |
| *B01J 20/20* | (2006.01) | |
| *B01J 20/24* | (2006.01) | |
| *B01J 20/28* | (2006.01) | |
| *B01J 20/30* | (2006.01) | |
| *A01K 1/015* | (2006.01) | |

(52) U.S. Cl.
CPC ............. *B01J 20/26* (2013.01); *B01J 20/20* (2013.01); *B01J 20/24* (2013.01); *B01J 20/2803* (2013.01); *B01J 20/3028* (2013.01); *A01K 1/0155* (2013.01)

(58) Field of Classification Search
CPC ... B01J 20/20; B01J 20/24; B01J 20/26; B01J 20/2803

See application file for complete search history.

(56) References Cited

U.S. PATENT DOCUMENTS

| 11,357,880 B2 * | 6/2022 | Yoshinaga ................ B01J 2/20 |
|---|---|---|
| 2009/0038554 A1 | 2/2009 | Tsutsumi et al. |
| 2013/0266657 A1 | 10/2013 | Trajkovska |

FOREIGN PATENT DOCUMENTS

| CN | 103269728 A | 8/2013 |
|---|---|---|
| EP | 0 799 861 A1 | 10/1997 |
| EP | 1 080 709 A2 | 3/2001 |
| EP | 1 352 927 A1 | 10/2003 |
| JP | H04-3411 B2 | 1/1992 |

(Continued)

OTHER PUBLICATIONS

Machine translation of WO-2014057535-A1 (Year: 2014).*
Machine Translation of JP 5965560 (Year: 2016).*
Machine translation of JP-2003158932-A (Year: 2003).*
Machine translation of JP-2010124804-A (Year: 2010).*

(Continued)

*Primary Examiner* — Timothy C Cleveland
(74) *Attorney, Agent, or Firm* — Oliff PLC

(57) ABSTRACT

A water absorption treatment material absorbs a liquid containing a malodorous substance, and includes a first grain and a second grain. The first grain consists essentially of a porous material having an action of deodorizing the malodorous substance. The second grain contains a water-absorptive material other than the porous material as its main material.

18 Claims, 3 Drawing Sheets

(56) References Cited

FOREIGN PATENT DOCUMENTS

| JP | H04-3412 B2 | | 1/1992 | |
|---|---|---|---|---|
| JP | 2002-034372 A | | 2/2002 | |
| JP | 2003158932 A | * | 6/2003 | |
| JP | 2010124804 A | * | 6/2010 | |
| JP | 2010-158253 A | | 7/2010 | |
| JP | 5965560 B1 | * | 8/2016 | ........... A01K 1/0155 |
| WO | 2005/120594 A1 | | 12/2005 | |
| WO | 2007/077756 A1 | | 7/2007 | |
| WO | 2007/121941 A2 | | 11/2007 | |
| WO | 2012/163995 A1 | | 12/2012 | |
| WO | 2014/019813 A1 | | 2/2014 | |
| WO | WO-2014057535 A1 | * | 4/2014 | ........... A01K 1/0155 |
| WO | 2014/192323 A1 | | 12/2014 | |

OTHER PUBLICATIONS

Graham et al., "Commercial Processes for the Manufacture of Superabsorbent Polymers," Modern Superabsorbent Polymer Technology, edited by Buchholz et al., John Wiley & Sons, Inc., 1998, pp. 69-115.

May 21, 2019 International Search Report issued in International Patent Application No. PCT/JP2019/014641.

May 21, 2019 Written Opinion issued in International Patent Application No. PCT/JP2019/014641.

Feb. 19, 2020 Third Party Observiation issued in International Patent Application No. PCT/JP2019/014641.

Sep. 11, 2023 Office Action issued in Japanese Patent Application No. 2018-079943.

\* cited by examiner

WATER ABSORPTION TREATMENT MATERIAL AND METHOD FOR MANUFACTURING THE SAME

CROSS REFERENCE TO RELATED APPLICATION

This is a Continuation of International Application No. PCT/JP2019/014641 filed Apr. 2, 2019, which claims the benefit of Japanese Application No. 2018-079943 filed Apr. 18, 2018. The contents of these applications are hereby incorporated by reference in their entirety.

TECHNICAL FIELD

The present invention relates to a water absorption treatment material that absorbs a liquid containing a malodorous substance, and a method for manufacturing the same.

BACKGROUND ART

A conventional water absorption treatment material is disclosed in, for example, Patent Document 1. The water absorption treatment material disclosed in Patent Document 1 is an excrement treatment material that absorbs excrement, and contains coffee-extracted grounds (extraction residue of roasted coffee beans) in addition to paper powder, bean curd lees, and sodium benzoate. The coffee-extracted grounds are a porous material that has a porous structure, and exhibit a deodorizing action by adsorbing malodorous substances such as ammonia with pores of the coffee-extracted grounds. Containing such a porous material can bring a deodorizing effect to the water absorption treatment material.

CITATION LIST

Patent Document

Patent Document 1: JP 2010-158253A

SUMMARY OF INVENTION

Technical Problem

However, the porous material (coffee-extracted grounds) is contained in the above-mentioned water absorption treatment material in a state of being mixed with other materials such as paper powder. In such structure, capability of adsorbing malodorous substances deteriorates because the pores of the porous material are blocked with the other materials. Therefore, there has been a problem that the deodorizing action of the porous material cannot be efficiently exhibited in the conventional water absorption treatment material.

Solution to Problem

The present invention has been made in view of the problem described above, and it is an object of the present invention to provide a water absorption treatment material in which a deodorizing action of a porous material can be efficiently exhibited, and a method for manufacturing the same.

A water absorption treatment material according to the present invention is a water absorption treatment material that absorbs a liquid containing a malodorous substance. The water absorption treatment material includes: a first grain that consists essentially of a porous material having an action of deodorizing the malodorous substance; and a second grain that contains a water-absorptive material other than the porous material as a main material.

In this water absorption treatment material, the grain (first grain) that consists essentially of the porous material is provided in addition to the ordinary grain (second grain) that contains the water-absorptive material other than the porous material as its main material. By isolating the porous material constituting the first grain from another material (material constituting the second grain) in such way, it is possible to avoid a situation in which pores of the porous material are blocked with another material. Thus, the deodorizing action of the porous material can be efficiently exhibited.

A method for manufacturing a water absorption treatment material according to the present invention is a method for manufacturing a water absorption treatment material that absorbs a liquid containing a malodorous substance. The method includes: a first grain forming step of forming a first grain that consists essentially of a porous material having an action of deodorizing the malodorous substance; and a second grain forming step of forming a second grain that contains a water absorptive material other than the porous material as a main material.

In this manufacturing method, the grain (first grain) that consists essentially of the porous material is formed in addition to the ordinary grain (second grain) that contains the water-absorptive material other than the porous material as its main material. By isolating the porous material constituting the first grain from another material (material constituting the second grain) in such way, it is possible to avoid a situation in which pores of the porous material are blocked with another material. Thus, in the manufactured water absorption treatment material, the deodorizing action of the porous material can be efficiently exhibited.

Advantageous Effects of Invention

According to the present invention, it is possible to implement a water absorption treatment material in which a deodorizing action of a porous material can be efficiently exhibited, and a method for manufacturing the same.

DESCRIPTION OF EMBODIMENTS

Figure 1:
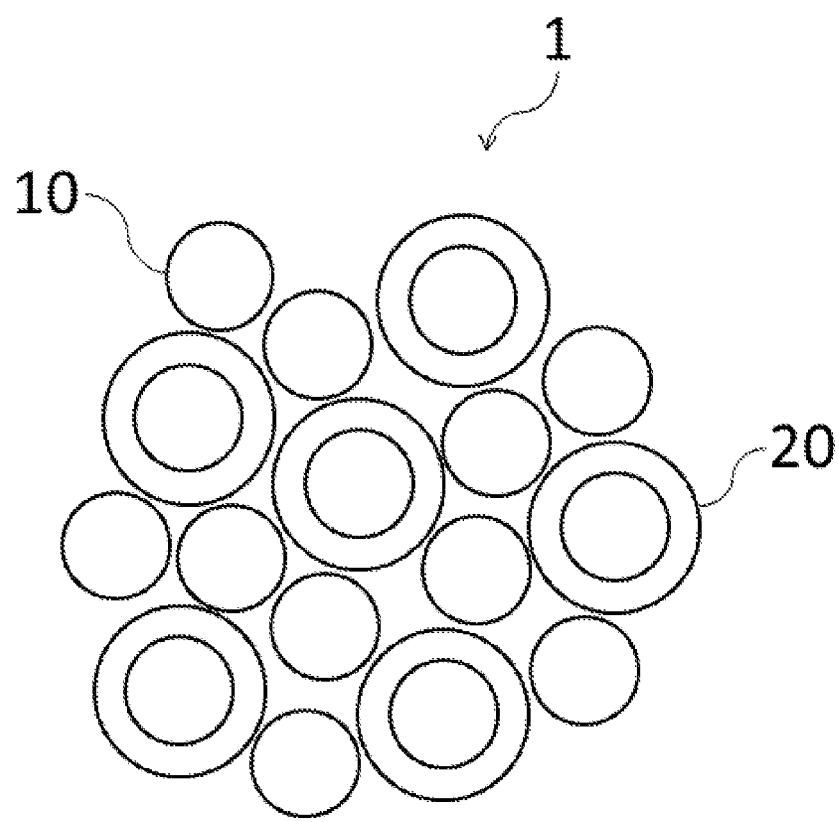
FIG. 1 is a schematic diagram of a water absorption treatment material according to an embodiment of the present invention.

Hereinafter, an embodiment of the present invention will be described in detail with reference to the drawings. In the description of the drawings, the same elements are given the same reference numerals, and a redundant description will be omitted.

FIG. 1 is a schematic diagram of a water absorption treatment material according to an embodiment of the present invention. A water absorption treatment material 1 is a water absorption treatment material that absorbs a liquid containing a malodorous substance, and includes a grain 10 (first grain) and a grain 20 (second grain). The grains 10 and 20 each have a water absorbing property, and absorb the liquid. The water absorption treatment material 1 is, for example, an excrement treatment material for absorbing excrement, a vomit treatment material for absorbing vomit, or a kitchen garbage treatment material for absorbing kitchen garbage (moisture contained in the kitchen garbage).

In the present embodiment, a plurality of the grains 10 and a plurality of the grains 20 are provided. In the water absorption treatment material 1, the grains 10 and the grains 20 are contained in a mixed manner. The number of the grains 10 is preferably 30% or more and 70% or less of the total number of the grains 10 and the grains 20, and more preferably 40% or more and 60% or less.

Figure 2:
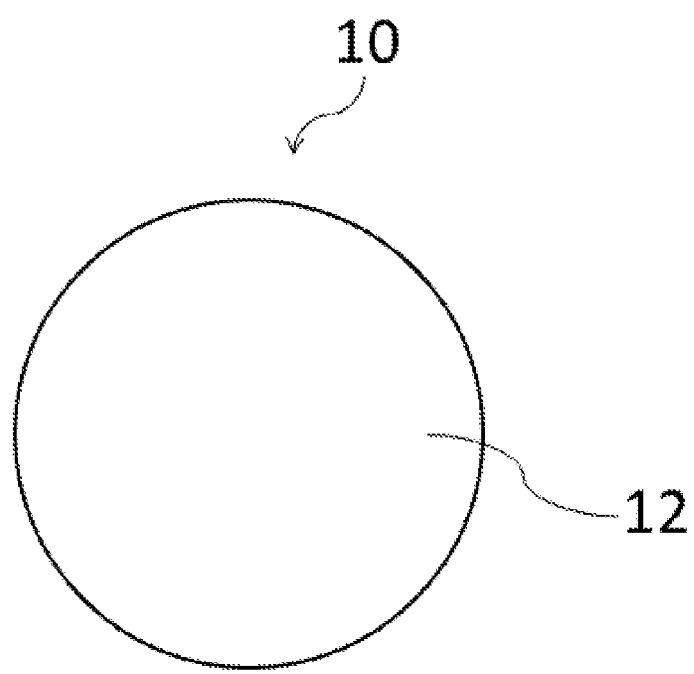
FIG. 2 is a schematic diagram of a grain 10.

FIG. 2 is a schematic diagram of the grain 10. The grain 10 includes a core portion 12 (first core portion). The core portion 12 is in a granular shape. The granular shape may be, for example, spherical, cylindrical, elliptic, or the like. The core portion 12 has a function of absorbing and retaining a liquid. As a material of the core portion 12, a porous material having an action of deodorizing the malodorous substance is used. The porous material may be organic matter or inorganic matter. Examples of a porous material of organic matter include coffee-extracted grounds, used tea leaves, and activated charcoal. Examples of a porous material of inorganic matter include silica gel, and bentonite. The core portion 12 consists essentially of the porous material.

In the grain 10, the core portion 12 is uncovered. A coating portion is not formed on the core portion 12, and thus the entire surface of the core portion 12 is exposed. That is, the grain 10 is composed only of the core portion 12. Therefore, the grain 10 also consists essentially of the porous material. Here, "consisting essentially of the porous material" means that an additive material such as an aromatic substance (perfume), coloring matter, or a metal ion may be contained in the grain 10 unless the deodorizing action of the porous material is inhibited. For example, the grain 10 may contain the aromatic substance, or may not contain the aromatic substance. The same applies to the coloring matter, and the metal ion. Even in the case where the additive material is contained, it is preferable that the weight ratio of the additive material with respect to the grain 10 is 1% or less (namely, the weight ratio of the porous material is 99% or more). As the metal ion mentioned above, it is possible to use, for example, a metal ion having an odor elimination function such as copper, or silver. It goes without saying that the grain 10 may "be composed only of the porous material", namely the grain 10 may not contain any material other than the porous material.

Figure 3:
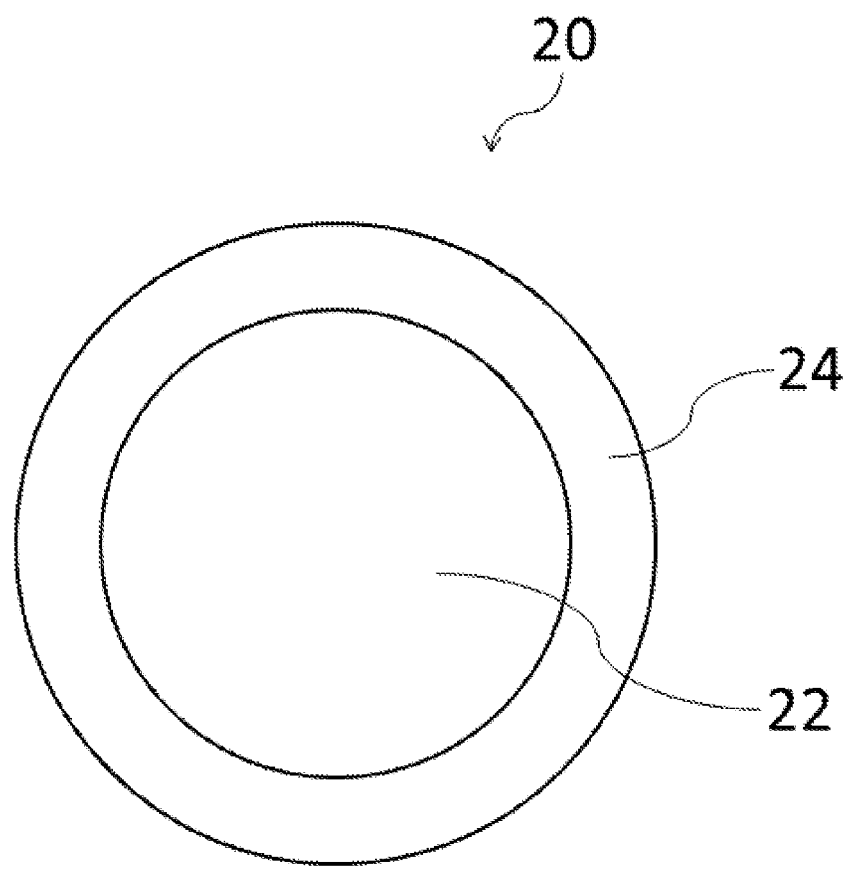
FIG. 3 is a schematic diagram of a grain 20.

FIG. 3 is a schematic diagram of the grain 20. The grain 20 contains a water-absorptive material other than the porous material as its main material. As used herein, the main material of the grain 20 refers to one of the materials constituting the grain 20 that accounts for the highest weight ratio in the grain 20. The water-absorptive material, which is the main material of the grain 20, is preferably organic matter. Examples of a water-absorptive material of organic matter include paper, plastics, and bean curd lees. In the present embodiment, the grain 20 does not contain the above-mentioned porous material.

The paper refers to a material composed mainly of pulp. Examples of the paper include ordinary paper, a vinyl chloride wallpaper classified product (paper obtained by classifying vinyl chloride wallpaper), a fluff pulp, a papermaking sludge, a pulp sludge, and the like. As the plastics, it is possible to use, for example, a disposable diaper classified product (plastics obtained by classifying disposable diapers). The bean curd lees are preferably dried bean curd lees.

The grain 20 includes a core portion 22 (second core portion) and a coating portion 24. The core portion 22 is in a granular shape. The core portion 22 has a function of absorbing and retaining a liquid. The core portion 22 contains the water-absorptive material mentioned above as its main material. The core portion 22 may be composed only of the water-absorptive material, or may be composed of a mixture of the water-absorptive material and other material(s). The particle diameter of the core portion 22 may be the same as the particle diameter of the core portion 12, or may be different from the particle diameter of the core portion 12. As used herein, the particle diameter is defined as the diameter of the minimum sphere that can contain the core portion.

The coating portion 24 covers the core portion 22. The coating portion 24 may cover the entire surface of the core portion 22, or may cover only a part of the surface of the core portion 22. The coating portion 24 has a function of bonding the grains 10 and 20 that have absorbed a liquid when in use, and clumping them together. Also as the main material of the coating portion 24, it is possible to use the water-absorptive material mentioned above. The coating portion 24 contains an adhesive material. As the adhesive material, it is possible to use, for example, starch, CMC (carboxymethyl cellulose), PVA (polyvinyl alcohol), dextrin, or a water-absorbent polymer. As described above, in the water absorption treatment material 1, the grain 20 has a multi-layer structure (two-layer structure) composed of the core portion 22 and the coating portion 24, whereas the grain 10 has a single-layer structure composed only of the core portion 12.

Next, an example of a method for manufacturing the water absorption treatment material 1 will be described as an embodiment of the method for manufacturing a water absorption treatment material according to the present invention. The manufacturing method includes a first grain forming step, a second grain forming step, and a mixing step.

The first grain forming step is a step of forming the grain 10. This step includes a first core portion forming step. The first core portion forming step is a step of forming the core portion 12. In this step, a granule that will serve as the core portion 12 is formed by granulating the porous material with a granulation apparatus. In the present embodiment, a plurality of the core portions 12 are formed. As the granulation apparatus, for example, an extrusion granulator can be used. Prior to granulation, the porous material is subjected to pre-treatment such as pulverization, kneading, and adding water, as needed. The core portions 12 are not coated in the first grain forming step. Accordingly, the grains 10 in each of which the core portion 12 is uncovered are obtained.

The second grain forming step is a step of forming the grain 20. This step includes a second core portion forming step, and a coating portion forming step. The second core portion forming step is a step of forming the core portion 22. In this step, a granule that will serve as the core portion 22 is formed by granulating the water-absorptive material and other material(s) with the granulation apparatus. In the present embodiment, a plurality of the core portions 22 are formed. Prior to granulation, the water-absorptive material and other material(s) are subjected to pre-treatment such as pulverization, kneading, and adding water, as needed.

The coating portion forming step is a step of forming the coating portion 24. In this step, the coating portion 24 is formed by attaching a powdery coating material to the surface of the core portion 22 with a coating apparatus or the like. The coating material contains the adhesive material. The coating material may be attached by, for example, sprinkling or spraying the coating material. In this way, the grains 20 in each of which the core portion 22 is covered by the coating portion 24 are obtained. Note that the first and second grain forming steps may be performed in arbitrary order. That is, the both steps may be performed simultaneously in parallel, or either step may be performed prior to the other step.

The mixing step is a step of mixing the grains 10 formed in the first grain forming step and the grains 20 formed in the second grain forming step. In this step, it is preferable to mix the grains 10 and the grains 20 such that the number of the grains 10 is 30% or more and 70% or less of the total number of the grains 10 and the grains 20. It is more preferable to mix the grains 10 and the grains 20 such that the number of the grains 10 is 40% or more and 60% or less of the total number of the grains 10 and the grains 20. In this step, the mixed grains 10 and 20 are preferably stirred. In this way, the water absorption treatment material 1 that includes the grains 10 and the grains 20 in a mixed manner is obtained.

Advantageous effects of the present embodiment will be described. In the present embodiment, the grain (grain 10) that consists essentially of the porous material is formed in addition to the ordinary grain (grain 20) that contains the water-absorptive material other than the porous material as its main material. By isolating the porous material constituting the grain 10 from other materials (materials constituting the grain 20) in such way, it is possible to avoid a situation in which pores of the porous material are blocked with the other materials. Thus, in the water absorption treatment material 1, the deodorizing action of the porous material can be efficiently exhibited.

In contrast, in a case where the porous material is mixed with another material, the deodorizing action of the porous material is inhibited due to reasons such as the pores of the porous material being blocked with another material. Especially in a case where the porous material is used for a core portion in a grain having a coating portion, the porous material of the core portion is covered by the coating portion. This also causes inhibition of the deodorizing action of the porous material. In the present embodiment, it is possible to solve such problem and bring out the deodorizing action of the porous material efficiently. Therefore, it becomes possible to obtain a deodorizing effect equivalent to the conventional water absorption treatment material, even if using smaller amount of the porous material than the conventional water absorption treatment material. This contributes to saving of the porous material and eventually reduction in the manufacturing cost of the water absorption treatment material 1. Moreover, if using the same amount of the porous material as the conventional water absorption treatment material, it is possible to obtain a higher deodorizing effect than the conventional water absorption treatment material.

From the viewpoint of saving the porous material and achieving reduction in the manufacturing cost, it is advantageous that the grains 10 account for a smaller proportion in the entire water absorption treatment material 1. From this viewpoint, the number of the grains 10 is preferably 70% or less of the total number of the grains 10 and the grains 20, and more preferably 60% or less. If, on the other hand, the proportion of the grains 10 is too small, the deodorizing action of the porous material will be insufficient, which may cause insufficiency of the deodorizing effect of the water absorption treatment material 1. From this viewpoint, the number of the grains 10 is preferably 30% or more of the total number of the grains 10 and the grains 20, and more preferably 40% or more.

The grain 20 does not contain the porous material. Thus, it is possible to save the porous material and further reduce the manufacturing cost of the water absorption treatment material 1. However, it is not required that the grain 20 does not contain the porous material.

In the grain 10, the core portion 12 is uncovered. That is, the core portion 12 is not coated. On the other hand, in the grain 20, the core portion 22 is covered by the coating portion 24 containing the adhesive material. By providing only a part of the grains (grain 20) with the coating portion as described above, it is possible to save the coating material. Also, the bonding effect of the coating portion 24 provided in the grain 20 is also exerted on the grain 10 around the grain 20. For this reason, even though the grain 10 is not provided with a coating portion, a clump composed of used grains 10 and 20 is formed. Accordingly, it is possible to obtain a clump of the grains 10 and 20 after use while saving the coating material.

In the case where the particle diameter of the core portion 22 is the same as the particle diameter of the core portion 12, it becomes possible to use the same granulation apparatus for forming the core portion 12 and the core portion 22. On the other hand, in the case where the particle diameter of the core portion 22 is different from the particle diameter of the core portion 12, it is possible to increase freedom in design for the particle diameter of the core portion 12. That is, the particle diameter of the core portion 12 can be greater than the particle diameter of the core portion 22, and can be less than the particle diameter of the core portion 22. By making the particle diameter of the core portion 12 larger, it is possible to increase the quantity of a malodorous substance which can be adsorbed by one grain 10. On the contrary, by making the particle diameter of the core portion 12 smaller, it is possible to enlarge the ratio of the surface area with respect to the volume in the grain 10. This means increase of the ratio of the porous material that is exposed to the outside of the grain 10. The porous material exposed to the outside of the grain 10 in such way is more likely to catch a malodorous substance than the porous material that is hidden inside the grain 10. Therefore, by increasing the ratio of the porous material exposed to the outside, it is possible to bring out the deodorizing action of the porous material more efficiently.

In the case where the porous material constituting the grain 10 is organic matter, it is possible to obtain the grain 10 suitable for being disposed of by incineration. Likewise, in the case where the water-absorptive material constituting the grain 20 is organic matter, it is possible to obtain the grain 20 suitable for being disposed of by incineration. When the grains 10 and 20 are suitable for being disposed of by incineration, the water absorption treatment material 1 after use can be discarded as combustible trash, and it is therefore possible to improve convenience for the users.

The present invention is not limited to the embodiment given above, and various modifications can be made. In the embodiment given above, the grain 10 may be configured to collapse when absorbing a liquid. Such grain 10 can be realized by reducing the compressive force that is applied to the porous material during granulation. For example, the compressive force applied to the porous material can be reduced by reducing the thickness of a die of an extrusion granulator. In the case where the grain 10 collapses when absorbing a liquid in such way, it is possible to expose the porous material that has been hidden inside the grain 10 to the outside. Thus, it is possible to bring out the deodorizing action of the porous material more efficiently.

In the embodiment described above, an example is given in which the grain 20 is provided with the coating portion 24. However, it is not required that the grain 20 is provided with the coating portion 24. That is, the grain 20 may have a single-layer structure composed only of the core portion 22.

LIST OF REFERENCE NUMERALS

1 Water Absorption Treatment Material
10 Grain (First Grain)
12 Core Portion (First Core Portion)
20 Grain (Second Grain)
22 Core Portion (Second Core Portion)
24 Coating Portion

The invention claimed is:

1. A water absorption treatment material that absorbs a liquid containing a malodorous substance, the water absorption treatment material comprising:
a plurality of a first grain that consists essentially of a porous material having an action of deodorizing the malodorous substance, the porous material being activated charcoal; and
a plurality of a second grain that contains a water-absorptive material other than the porous material as a main material,
wherein the plurality of the first grain constitutes 30% or more and 70% or less of a total amount of grains in the water absorption treatment material.

2. The water absorption treatment material according to claim 1,
wherein the second grain does not contain the porous material.

3. The water absorption treatment material according to claim 1,
wherein the first grain collapses when absorbing the liquid.

4. The water absorption treatment material according to claim 1, wherein
the first grain includes a first core portion in a granular shape,
the second grain includes
a second core portion in a granular shape, and
a coating portion that contains an adhesive material and covers the second core portion, and
in the first grain, the first core portion is uncovered.

5. The water absorption treatment material according to claim 4,
wherein a particle diameter of the second core portion is the same as a particle diameter of the first core portion.

6. The water absorption treatment material according to claim 4,
wherein a particle diameter of the second core portion is different from a particle diameter of the first core portion.

7. The water absorption treatment material according to claim 4,
wherein the adhesive material is a water-absorbent polymer.

8. A method for manufacturing a water absorption treatment material that absorbs a liquid containing a malodorous substance, the method comprising:
a first grain forming step of forming a plurality of a first grain that consists essentially of a porous material having an action of deodorizing the malodorous substance, the porous material being activated charcoal; and
a second grain forming step of forming a plurality of a second grain that contains a water-absorptive material other than the porous material as a main material,
wherein the plurality of the first grain constitutes 30% or more and 70% or less of a total amount of grains in the water absorption treatment material.

9. The method for manufacturing a water absorption treatment material according to claim 8, further comprising:
a mixing step of mixing the plurality of the first grain and the plurality of the second grain.

10. The method for manufacturing a water absorption treatment material according to claim 8,
wherein in the second grain forming step, the second grain that does not contain the porous material is formed.

11. The method for manufacturing a water absorption treatment material according to claim 8,
wherein in the first grain forming step, the first grain that collapses when absorbing the liquid is formed.

12. The method for manufacturing a water absorption treatment material according to claim 8,
wherein the first grain forming step includes a first core portion forming step of forming a first core portion in a granular shape,
the second grain forming step includes a second core portion forming step of forming a second core portion in a granular shape, and a coating portion forming step of forming a coating portion that contains an adhesive material and covers the second core portion, and
in the first grain forming step, the first grain in which the first core portion is uncovered is formed.

13. The method for manufacturing a water absorption treatment material according to claim 12,
wherein in the second core portion forming step, the second core portion is formed such that a particle diameter of the second core portion is the same as a particle diameter of the first core portion.

14. The method for manufacturing a water absorption treatment material according to claim 12,
wherein in the second core portion forming step, the second core portion is formed such that a particle diameter of the second core portion is different from a particle diameter of the first core portion.

15. The water absorption treatment material according to claim 1,
wherein the water-absorptive material is paper or bean curd lees.

16. The method for manufacturing a water absorption treatment material according to claim 8,
wherein the water-absorptive material is paper or bean curd lees.

17. The water absorption treatment material according to claim 1, consisting of the plurality of the first grain and the plurality of the second grain.

18. The water absorption treatment material according to claim 17,
wherein the water-absorptive material is paper or bean curd lees.

* * * * *